United States Patent [19]

Stallings, Jr. et al.

[11] Patent Number: 5,286,050
[45] Date of Patent: Feb. 15, 1994

[54] HITCH FOR TRAILERS

[75] Inventors: James C. Stallings, Jr., Gaston; James C. Stallings, III, Macclesfield, both of N.C.

[73] Assignee: Unlimited Solutions, Inc., Battleboro, N.C.

[21] Appl. No.: 901,518

[22] Filed: Jun. 19, 1992

Related U.S. Application Data

[63] Continuation-in-part of Ser. No. 849,359, Mar. 11, 1992, abandoned.

[51] Int. Cl.5 .............................................. B60D 1/36
[52] U.S. Cl. .................................. 280/477; 280/504; 172/272
[58] Field of Search ............... 280/416.2, 425.1, 474, 280/477, 478.1, 490.1, 504, 508, 490.1, 515; 172/272, 274; 414/481

[56] References Cited

U.S. PATENT DOCUMENTS

| 3,889,979 | 7/1975 | Schmiesing | 280/508 X |
| 4,015,855 | 4/1977 | Murray | 580/416.2 |
| 4,265,465 | 5/1981 | Dietrich, Sr. | |
| 4,298,212 | 11/1981 | Jamison | 280/515 |
| 4,360,216 | 11/1982 | Wiemers | 172/272 X |
| 4,377,296 | 3/1983 | Ulshafer, Jr. | 280/416.2 |
| 4,389,058 | 6/1983 | Cadwell | 280/515 X |
| 4,397,475 | 8/1983 | Dietrich, Sr. et al. | |
| 4,431,207 | 2/1984 | Lagenfeld et al. | 280/416.2 |
| 4,575,111 | 3/1986 | Roberson | 280/515 X |
| 5,037,123 | 8/1991 | Smith | 280/477 |

FOREIGN PATENT DOCUMENTS 0537062 10/1931 Fed. Rep. of Germany ...... 280/477
0807176 4/1951 Fed. Rep. of Germany ...... 280/508
1523401 11/1989 U.S.S.R. ............................. 280/490.1

Primary Examiner—Margaret A. Focarino
Assistant Examiner—Victor E. Johnson
Attorney, Agent, or Firm—Bell, Seltzer, Park & Gibson

[57] ABSTRACT

The trailer hitch has a base frame adapted to be carried by a vehicle and a hitch frame adapted to engage the base frame. A power liftable actuator is attached to the base frame and the hitch frame for raising and lowering the hitch frame to engage the tongue of a trailer. A vertically arranged connecting pin is also attached to the hitch frame and is adapted to be moved in a vertical path of travel from an elevated uncoupled position to a lowered coupled position. A power operable actuator is connected to the hitch frame and the connecting pin for moving the connecting pin from an elevated uncoupled position to a lowered coupled position. In addition, the trailer hitch has a horizontally swingable tongue guide positioned alongside the connecting pin and the hitch frame. The horizontally swingable tongue guide is adapted to guide the tongue of a trailer into proper position for being connected by the connecting pin. The horizontally swingable tongue guide includes a pair of guide plates convergently arranged that define an angle therebetween with the vertex of the angle being closely adjacent the path of travel of the connecting pin. Also, a spring is used to resiliently mount the pair of guide plates for unison horizontal swinging movement to thereby facilitate the guiding of the trailer tongue toward the vertex. A scoop is mounted vertically below and adjacent the horizontally swingable tongue guide for scooping the trailer tongue from the ground for engagement with the connecting pin.

37 Claims, 14 Drawing Sheets

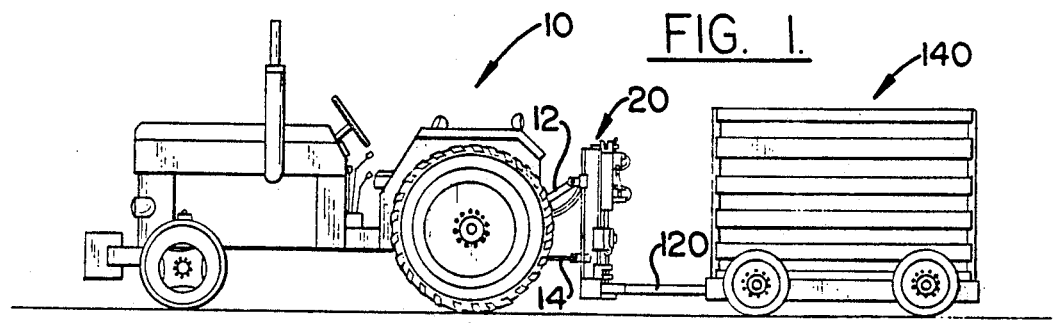
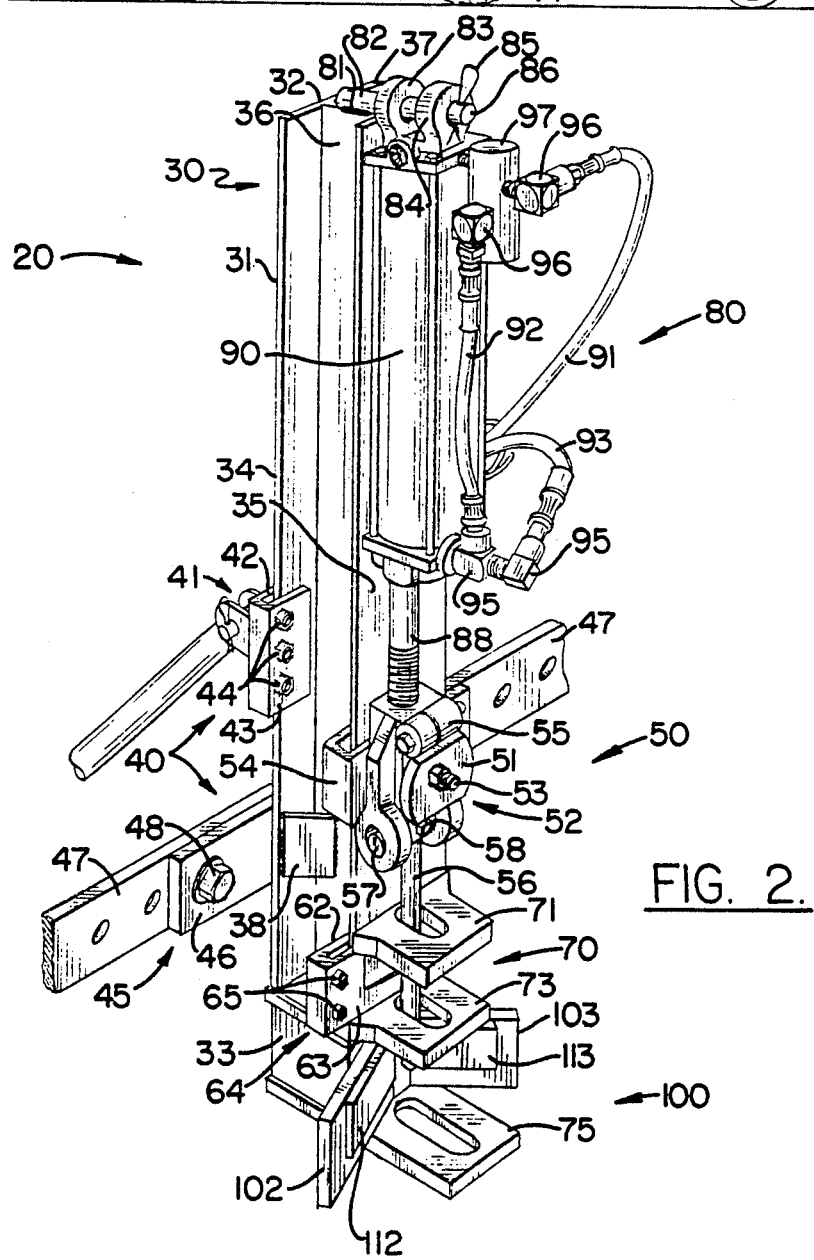

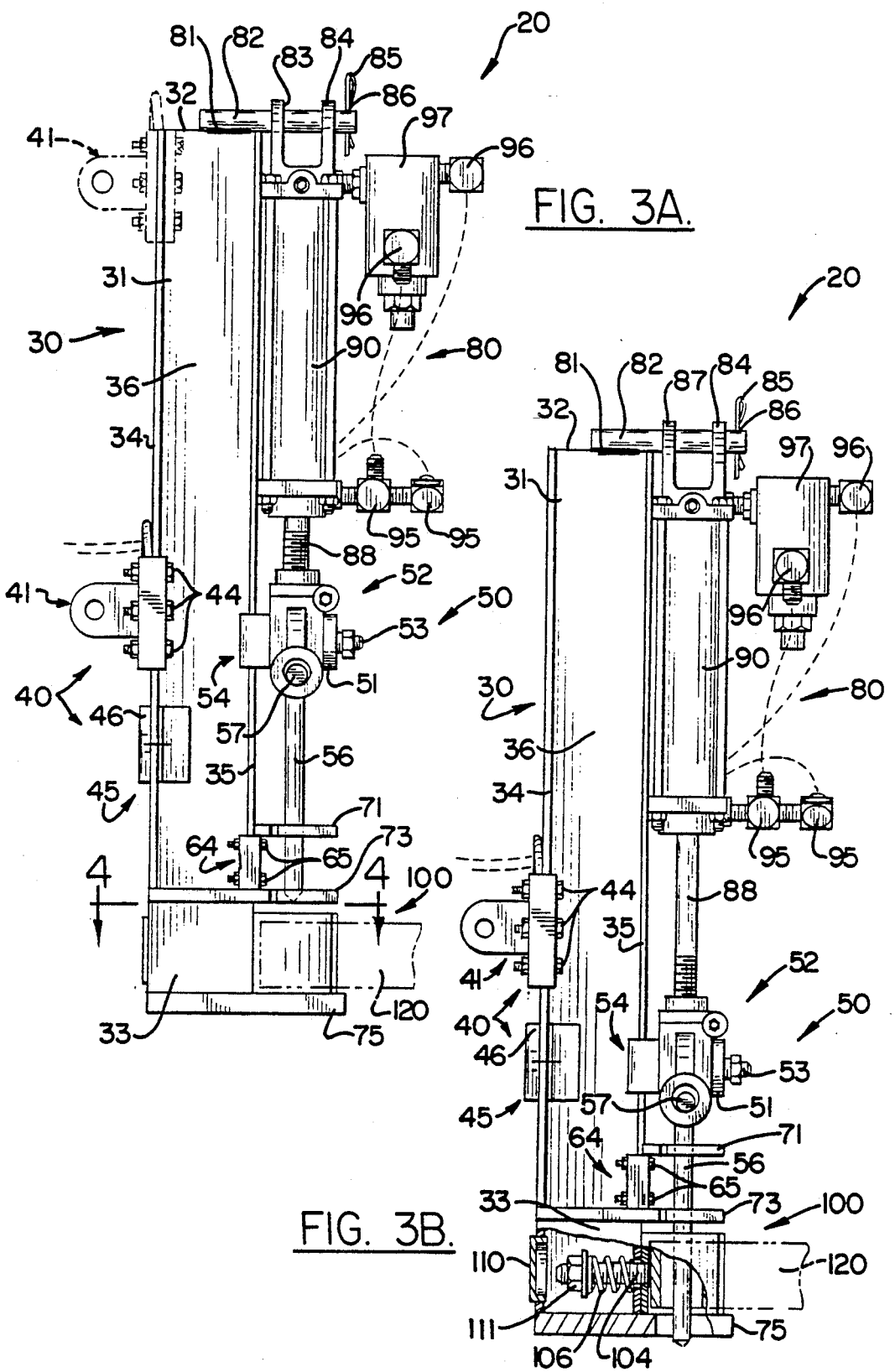

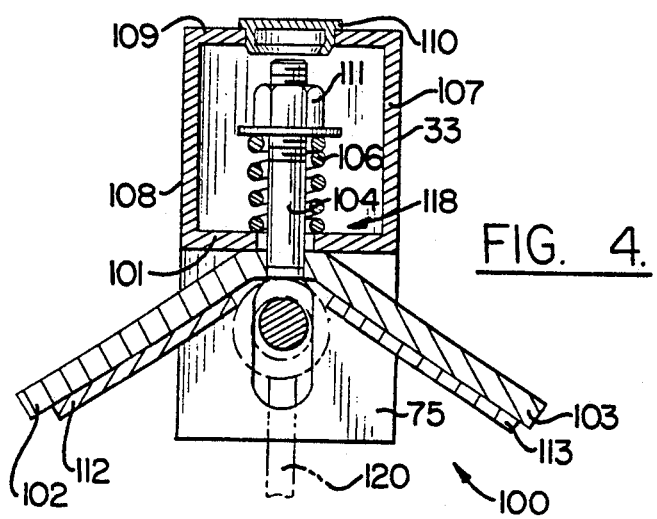
FIG. 4.
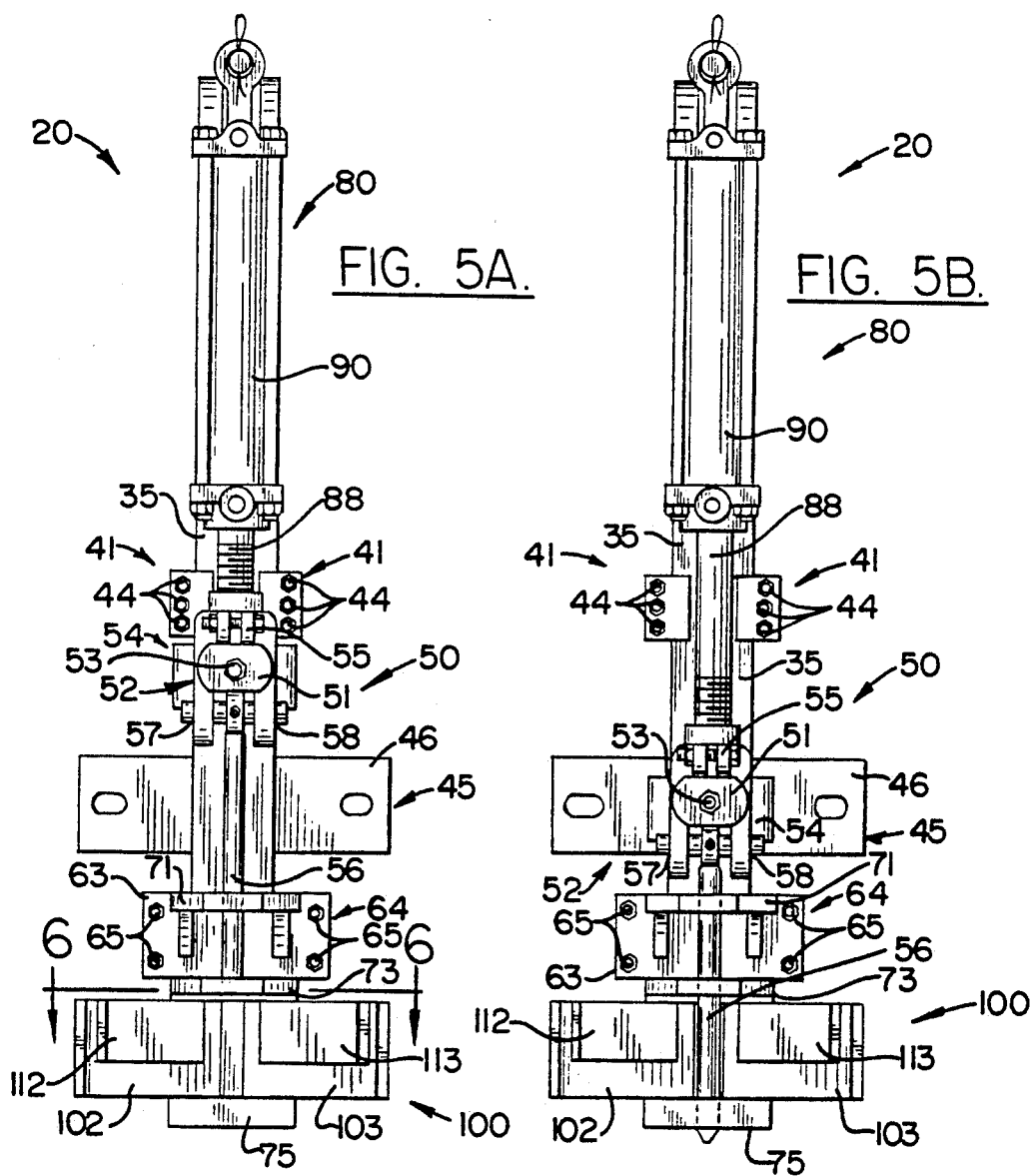
FIG. 5A.
FIG. 5B.

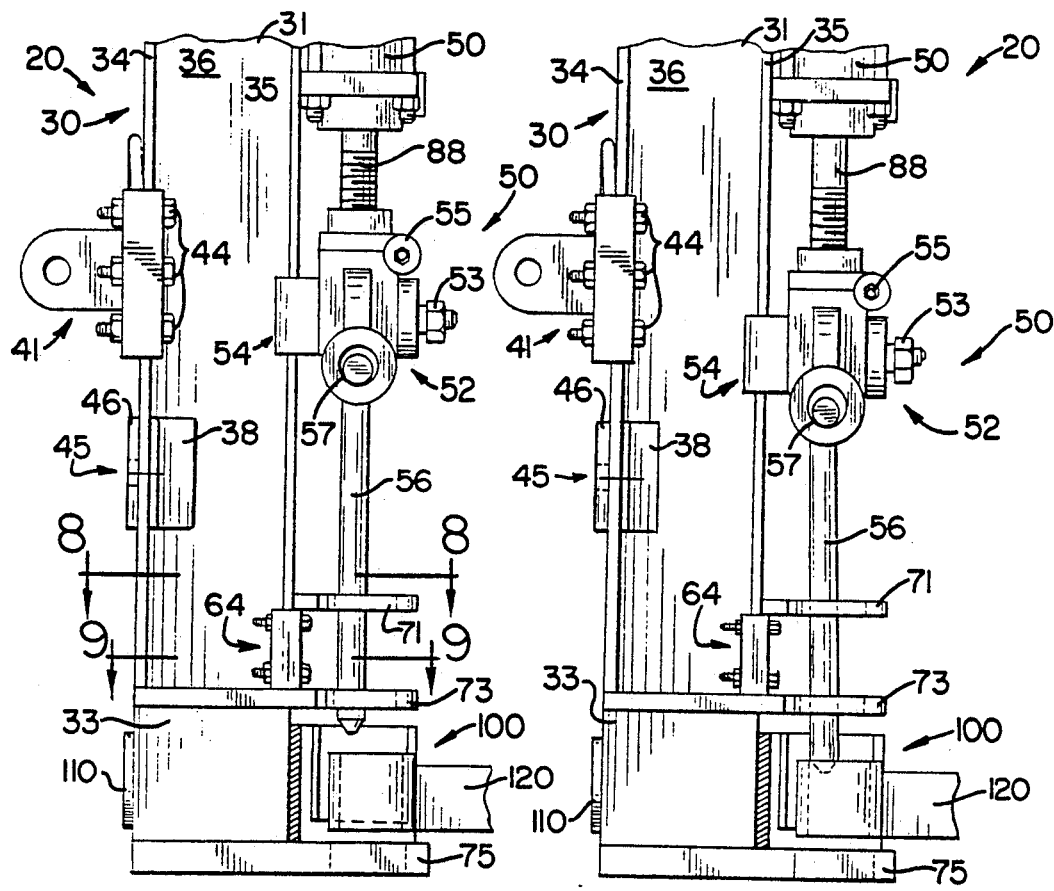
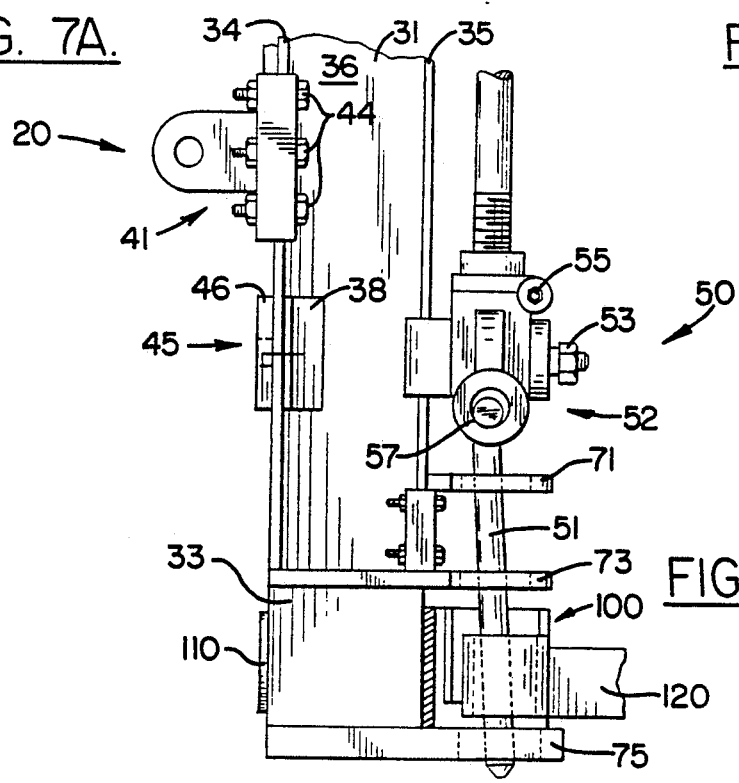
FIG. 7A.  FIG. 7B.  FIG. 7C.

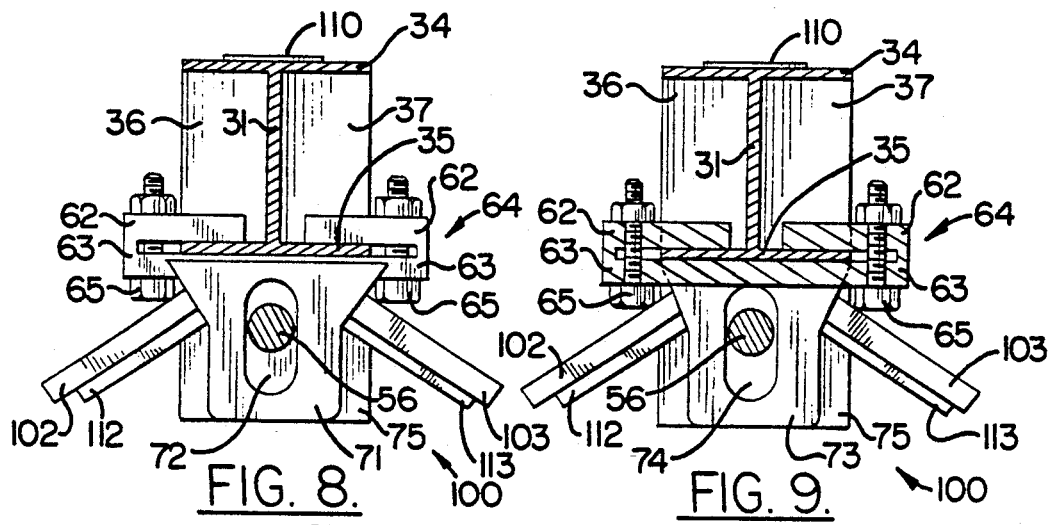
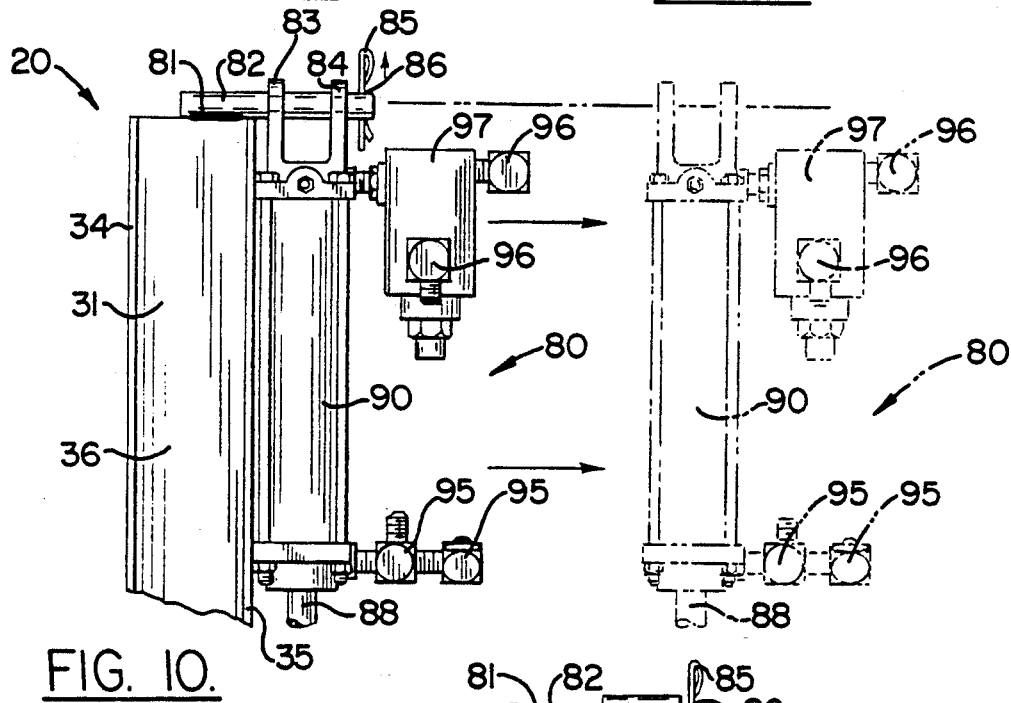
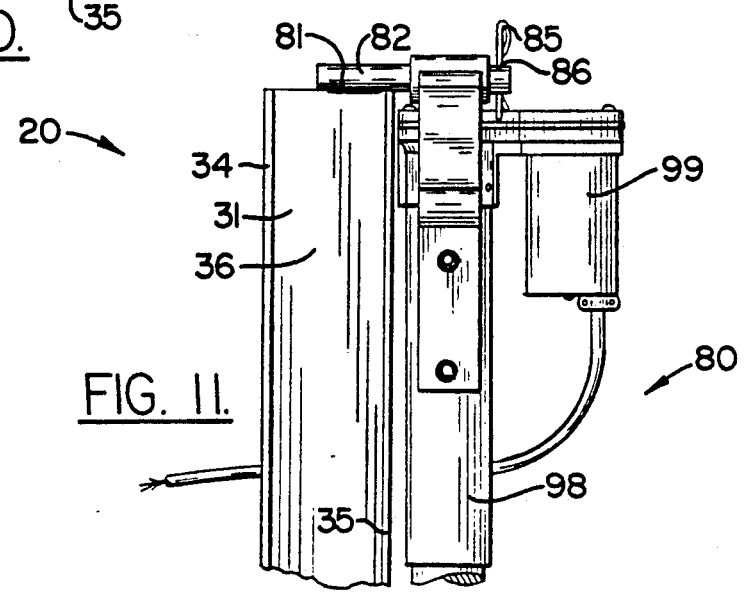

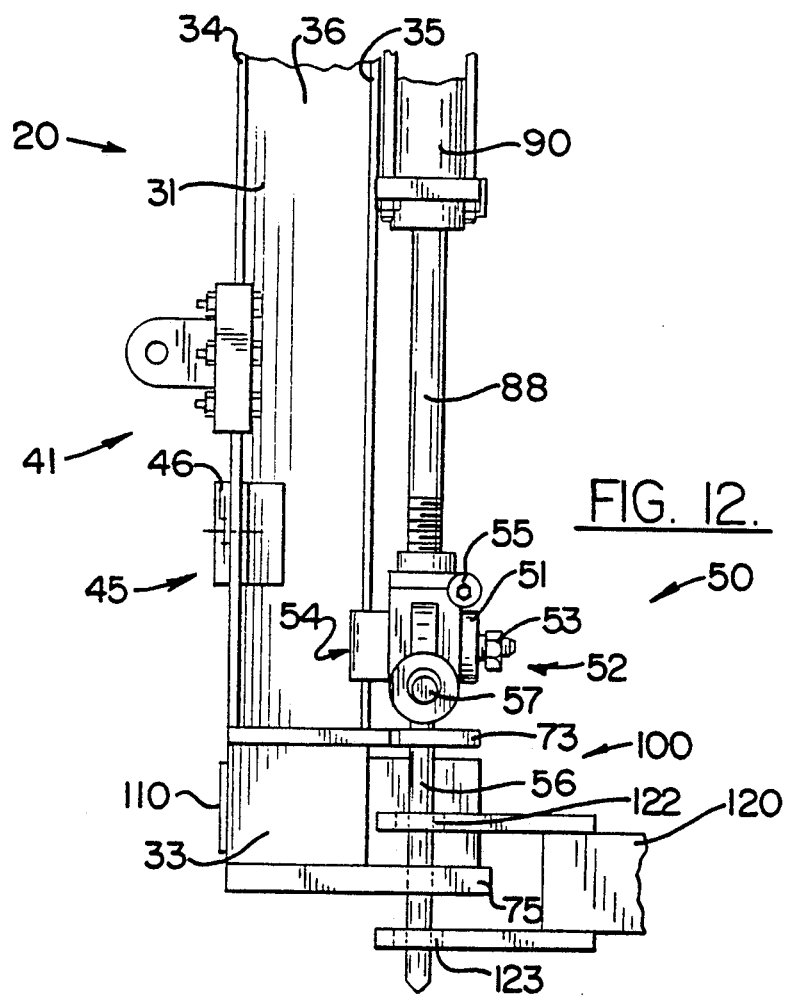

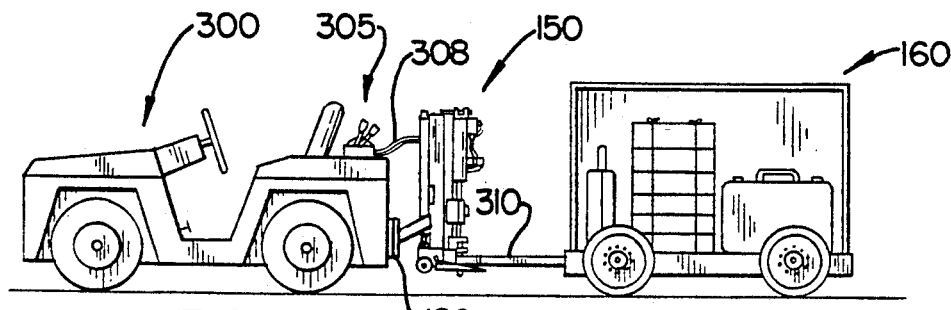
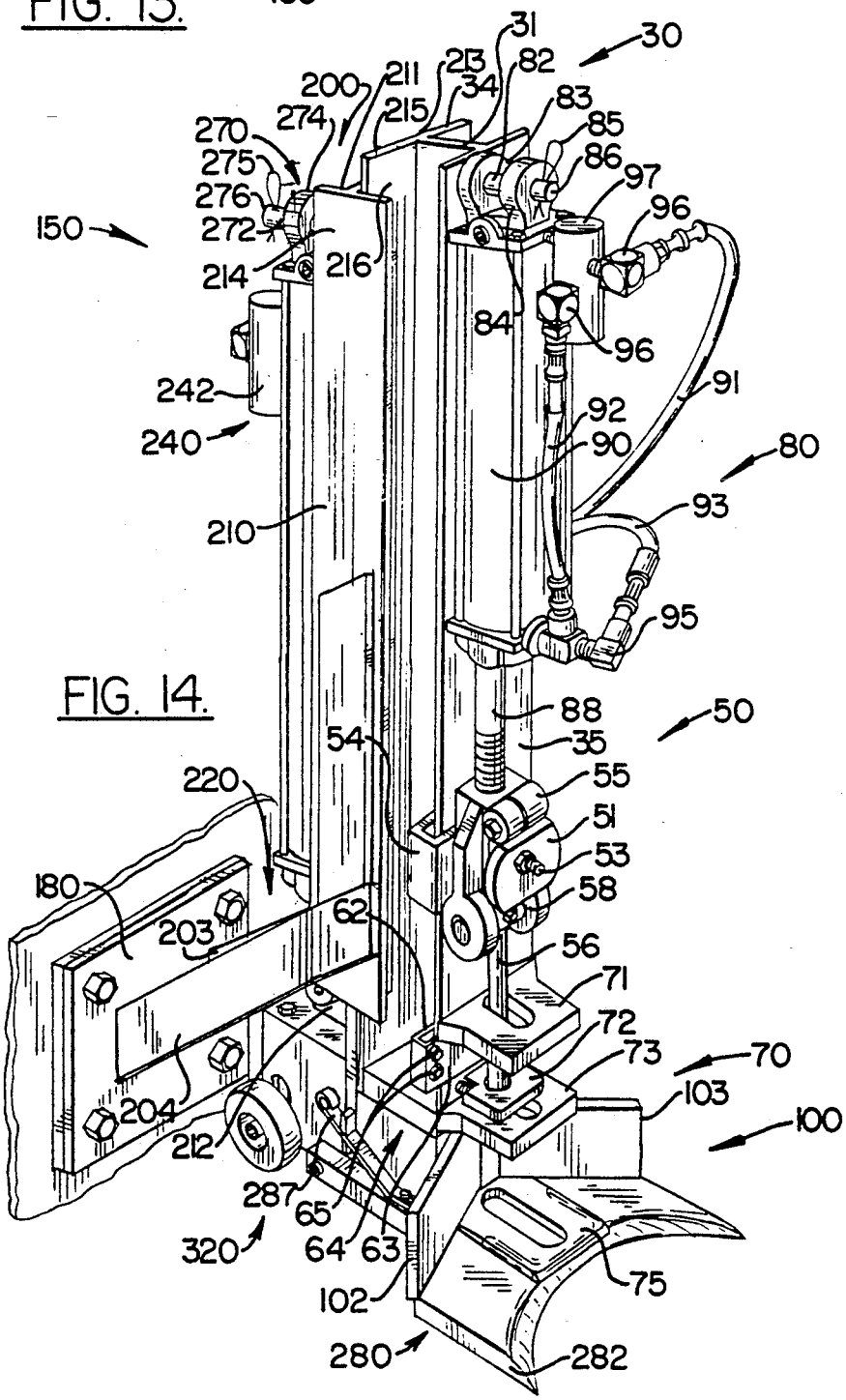

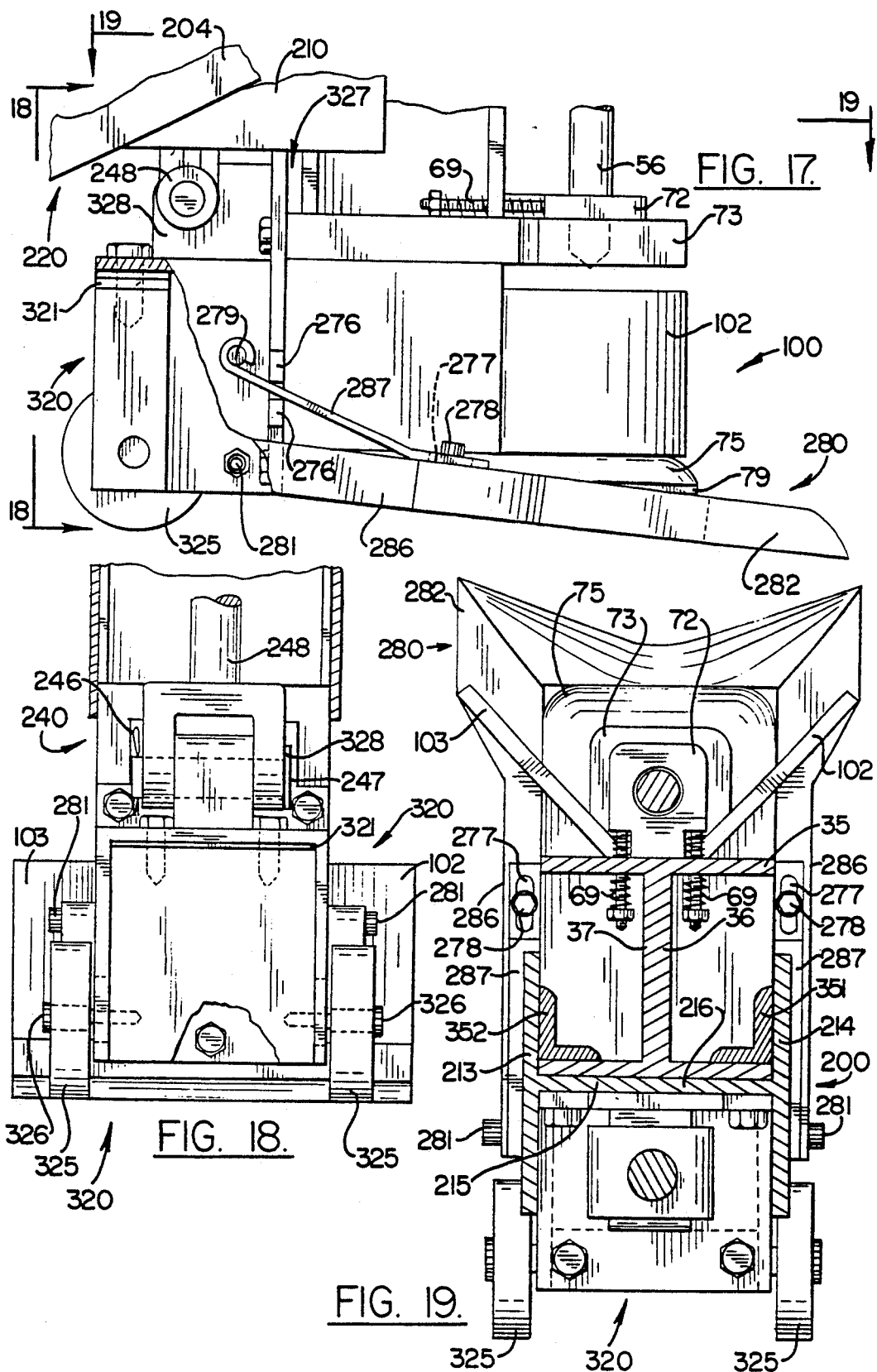

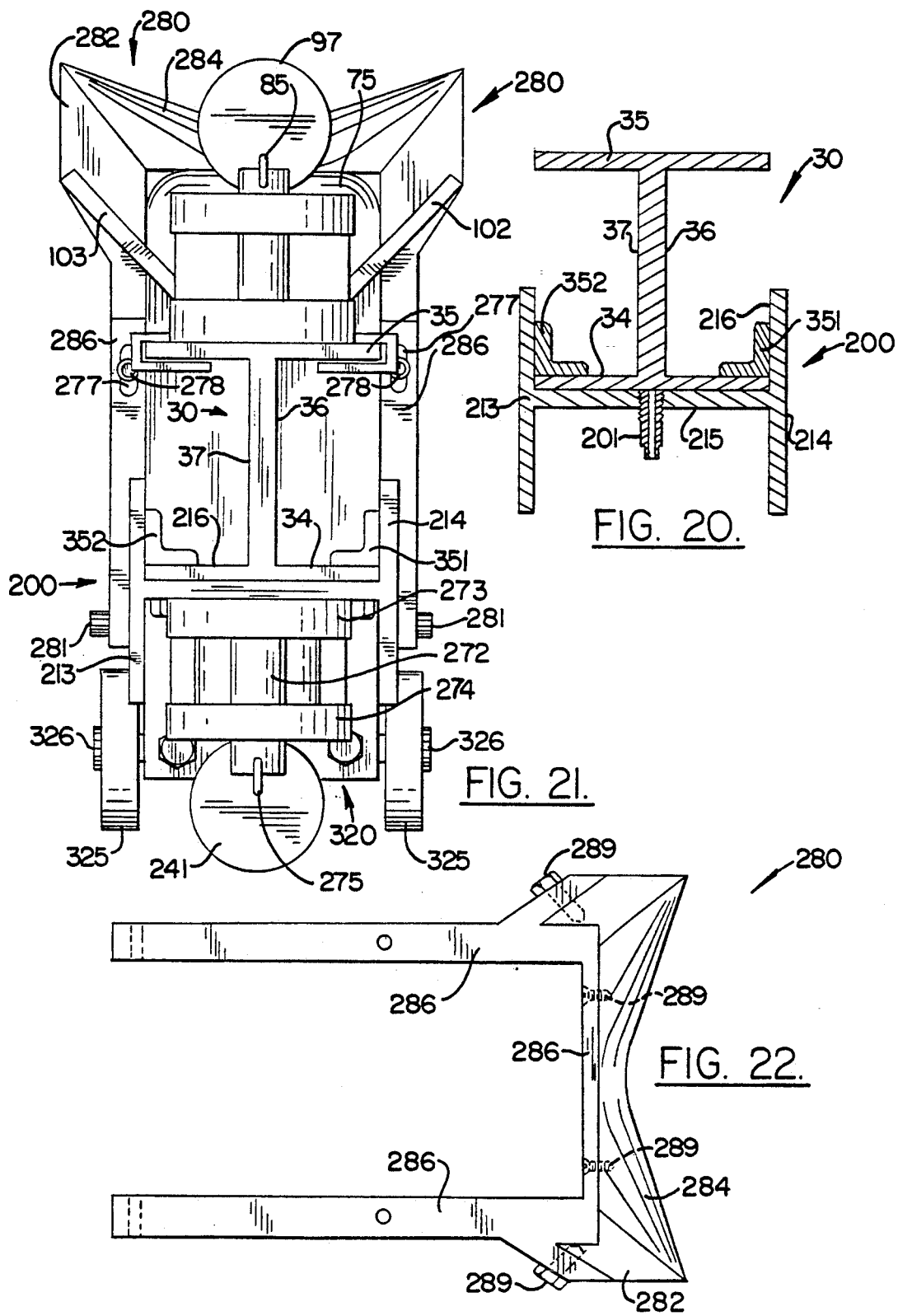

HITCH FOR TRAILERS

RELATED APPLICATIONS

This application is a continuation-in-part of U.S. patent application Ser. No. 07/849,359, filed Mar. 11, 1992 now abandoned.

FIELD OF THE INVENTION

This invention relates to trailer hitches, and more particularly, to trailer hitches attachable to a front or a rear of a tow vehicle, such as for engaging and connecting trailers in the airline industry.

BACKGROUND OF THE INVENTION

A conventional pin-type trailer hitch either requires a two-man operation or requires the vehicle operator to descend from the seat of the vehicle, perform a coupling or an uncoupling function, and then return to the seat for further operation of the vehicle. The conventional trailer hitch may also create a hazardous environment for operators involved in manually coupling and uncoupling trailers because of factors such as noise, inclement weather, bright lights, and heavy equipment involved. In addition, the frequency of the coupling and uncoupling operation may be quite high in any given work period, so that the time and effort involved may reduce the operator's work efficiency.

Several hitching devices have automated the coupling and uncoupling functions with various techniques for tractors and the like. Other hitches have automatic coupling and uncoupling functions for hitches mounted on the back of a vehicle bumper. Illustrative of these type of hitches mounted on the back of a vehicle bumper are U.S. Pat. No. 4,265,465 to Dietrich entitled "Trailer Bumper Hitch" and U.S. Pat. No. 4,397,475 to Dietrich entitled "Bumper Hitch With Universal Mounting Support." Unfortunately, these hitches are only adaptable to one particular trailer tongue type, do not have means for scooping the trailer tongue off the ground and guiding it into position for engagement with the trailer hitch, and do not prevent damage to the trailer tongue and hitch when the vehicle travels on rough terrain or makes sharp turns.

Therefore, there is a need for a versatile trailer hitch that: (1) allows the driver of the vehicle to slightly misalign the pin with the trailer tongue and still make the connection; (2) provides flexibility in making a secure and fail-safe pin connection with various trailer tongue types; (3) reduces damage to the trailer tongue and hitch when the vehicle makes sharp turns or travels on rough terrain; and (4) scoops the trailer tongue off of the ground and guides it into position for engagement with the trailer hitch attached to the vehicle, all without requiring the operator of the vehicle to leave its seat or requiring the assistance of a second person.

OBJECT AND SUMMARY OF THE INVENTION

It is an object of the present invention to provide a trailer hitch, such as is adaptable for various trailer tongue types.

It is also an object of the present invention to provide a trailer hitch which greatly reduces the likelihood of damage to the hitch and trailer tongue when traveling over rough terrain or making sharp turns.

It is also another object of the present invention to provide a trailer hitch which provides flexibility in making a secure and fail-safe connection by the connecting pin when engaging the trailer tongue.

It is a further object of the present invention to provide a trailer hitch which improves the work efficiency of the operator of a vehicle for pulling trailers.

These and other objects are provided in accordance with the present invention by a trailer hitch for connecting the tongue of a trailer to a vehicle having a base frame adapted to be carried by the vehicle, a hitch frame adapted to engage the base frame, and power liftable means adapted to be engaged with the base frame and the hitch frame for raising and lowering the hitch frame for engagement with the trailer tongue.

The hitch frame has power operable means adapted to be carried by the hitch frame, connecting pin means operably connected to the power operable means and including a vertically arranged connecting pin adapted to be moved in a vertical path of travel from an elevated uncoupled position to a lowered coupled position, horizontally swingable guide means positioned alongside the connecting pin and adapted to guide the tongue of a trailer into proper position for being connected by the connecting pin, and scoop means for sliding under the tongue of a trailer and to lift the tongue for contacting engagement with the horizontally swingable guide means and the connecting pin.

The horizontally swingable guide means preferably includes a pair of guide plates convergently arranged and defining an angle therebetween with the vertex of the angle being closely adjacent a path of travel of the connecting pin, and resilient means mounting the pair of guide plates for unison horizontal swinging movement facilitating the guiding of a trailer tongue toward the vertex. The scoop means is mounted below and adjacent the horizontally swingable guide means and has a forward end and a rear end. The forward end has beveled edges and is tilted slightly downward with respect to the rear end. The rear end has two opposite side portions and an open spaced medial portion therebetween adapted to be attached adjacent the horizontally swingable guide means.

BRIEF DESCRIPTION OF THE DRAWINGS

FIG. 1 is a side elevational view of a tractor including the trailer hitch according to the present invention and a trailer coupled thereto.

FIG. 2 is a perspective view of the trailer hitch as shown in FIG. 1.

FIGS. 3A and 3B are side elevational views of the mounting of the trailer hitch in an uncoupled and a coupled position, respectively.

FIG. 4 is a cross-sectional view of the tongue guide taken along lines 4—4 of FIG. 3A.

FIGS. 5A and 5B are front views of the trailer hitch as shown in FIGS. 3A and 3B, respectively.

FIGS. 7A, 7B, and 7C are side elevational views of a lower portion of the trailer hitch according to the present invention in various stages of coupling to a trailer tongue.

FIG. 8 is a horizontal cross-sectional view of the trailer hitch taken along lines 8—8 of FIG. 7A.

FIG. 9 is a cross-sectional view of the trailer hitch taken along lines 9—9 of FIG. 7A.

FIG. 10 is a side elevational view of an upper portion of the trailer hitch illustrating the removal of the hydraulic power means.

FIG. 11 is a side elevational view of the upper portion of the trailer hitch according to another embodiment of the present invention illustrating an electric power means.

FIG. 12 is a side elevational view of a lower portion of another embodiment of the trailer hitch according to the invention.

FIG. 13 is a side elevational view of a vehicle with the trailer hitch attached, according to another embodiment of the present invention, and a luggage trailer coupled thereto.

FIG. 14 is a perspective view of the trailer hitch according to another embodiment of the present invention as shown in FIG. 13.

FIG. 17 is a side view of the lower portion of the trailer hitch of FIG. 14 according to the present invention with parts broken away for clarity.

FIG. 18 is a back view of the lower portion of the trailer hitch taken along line 18—18 in FIG. 17 with parts broken away for clarity.

FIG. 19 is a top cross-sectional view of the lower portion of the trailer hitch taken along line 19—19 in FIG. 17 with parts broken away for clarity.

FIG. 20 is a top cross-sectional view of the trailer hitch of FIG. 14 according to the present invention.

FIG. 21 is a top view of the trailer hitch of FIG. 14 according to the present invention.

FIG. 22 is a top plan view of the preferred embodiment of the beveled scoop means of the trailer hitch of FIG. 14 according to the present invention.

DESCRIPTION OF A PREFERRED EMBODIMENT

Figure 6A:
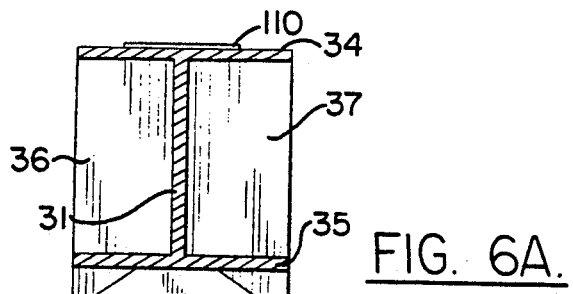
FIGS. 6A, 6B, and 6C are slightly enlarged cross-sectional views of the tongue guide as shown in FIG. 6 with the tongue of a trailer engaging the guide to illustrate the tongue guiding action and the horizontal swinging movement of the tongue guide.

The present invention now will be described more fully hereinafter with reference to the accompanying drawings in which the preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring to FIG. 1, there is shown a tractor 10 with the trailer hitch 20 according to the present invention coupled to the tractor 10. The trailer hitch 20 is coupled to the tractor 10 on an upper link arm 12 and two lower lift arms 14. The trailer hitch 20 is also engaged with the tongue 120 of a trailer 140. The trailer hitch 20 may also engage a tow bar or the like on a trailer or vehicle to be moved.

In FIG. 2 there is shown a perspective view of the trailer hitch 20 including a hitch frame 30. To the hitch frame 30 is coupled a leveling means 40, a connecting pin means 50, a power operable means 80, and a horizontally swingable guide means 100.

The hitch frame 30 comprises a metal beam 31 with a top end 32, a bottom end 33, a back side 34, and a front side 35. The hitch frame 30 also has two channels 36, 37 extending from the top end 32 to the bottom end 33 of the metal beam 31 between the back side 34 and the front side 35.

Coupled to the hitch frame 30 at the back side 34 of the metal beam 31 is a leveling means 40 which is adapted to be coupled to the tractor 10. The leveling means 40 has an upper bracket means 41 which is slidably coupled to the back side 34 of the metal beam 31 adjacent each of the channels 36, 37. The position of the upper bracket means 41 may be selectively adjusted up and down the back side of the metal beam in order to couple the upper bracket means 41 with the upper link arm 12 of tractor 10 in an appropriate position for vertically orienting the trailer hitch 20 for engagement with the trailer tongue 120, as shown in FIG. 1.

The adjustments in the position of the upper bracket means 41 is made by positioning two metal plates 42, 43 on the back side 34 of metal beam 31 along the two channels 36, 37 and then securing same in position by tightening three bolts 44 which extend through corresponding openings in the two metal plates. The leveling means 40 also has a lower bracket means 45 which is fixedly coupled to the metal beam 31 below the upper bracket means 41. The lower bracket means 45 also is coupled to the tractor 10, but at the two lower lift arms 14. The lower bracket means 45 has a metal plate 46 fixedly attached to the back side 34 of the metal beam 31. The metal plate 46 is adjustably connected to a metal plate 47 of the tractor 10 attached to the two lower arms 14 by positioning bolts 48 through openings in the two metal plates 46, 47. Two metal support braces 38 are welded cross-cornered in the channels 36, 37 of the metal beam 31 to reinforce the connection of the lower bracket means 45 to the metal beam 31. The support braces 38 are also located behind the attachment of the lower bracket means 45 to the metal beam 31.

Also attached to the hitch frame 30 and the power means 80 is the connecting pin means 50. The connecting pin means 50 is positioned adjacent the front side 35 of the metal beam 31 of the hitch frame 30 by a first bracket assembly 54 and a second bracket assembly 64. The first bracket assembly 54 interconnects with pivotal means 52 through a metal plate 51, also attached to the pivotal means 52 by a hinge means 55, by a bolt 53. The first bracket assembly 54 also slidably engages with the front side 35 of the metal beam 31 along channels 36 and 37. The first bracket assembly 54 moves up and down the front side 35 along the channels 36 and 37 as the power operable means 80 selectively engages the connecting pin means 50 with the trailer tongue 120 of the trailer 140. The second bracket assembly 64, on the other hand, interconnects with the slot guide brace 70 of the connecting pin means 50 to secure the slot guide brace 70 to the hitch frame 30. The second bracket assembly 64 likewise engages with the front side 35 of the metal beam 31, but below the first bracket assembly 54. The second bracket assembly 64 is attached to the front side 35 along channels 36 and 37 by positioning two metal plates 62, 63 along the front side 35 of metal beam 31 along the two channels 36, 37 and then securing the position of the metal plates 62, 63 by tightening two bolts 65 which extend through the two metal plates 62, 63.

The slot guide brace 70 has a first slotted pin guide 71, a second slotted pin guide 73, and a third slotted pin guide 75 spaced apart with the second slotted pin guide 73 beneath the first slotted pin guide 71 and the third slotted pin guide 75 beneath the second slotted pin guide 73. A connecting pin 56 interconnects with the pivotal means 52 along socket openings 57 and 58. The connection with the socket openings 57, 58 allows the connecting pin 56 to pivotally slide in the forward and backward direction for engagement flexibility with the trailer tongue 120. The connecting pin 56 slidably inserts through the first slotted pin guide 71, the second slotted pin guide 73, and the third slotted pin guide 75 during engagement and release of the trailer tongue 120. The first slotted pin guide 71 also limits the engagement stroke of the connecting pin 56 by preventing the pivotal means 52 from extending down below the first slotted pin guide 71. The pivotal means 52 and the connecting pin 56 of the connecting pin means 50 raises and lowers for release and engagement of trailer tongue 120 via power received from the power operable means 80 which is connected to the shoulder means 52.

The power operable means 80 is attached to the top end 32 of the hitch frame 30 by a brace pin 82 welded at welding spot 81 to the top end 32 of the hitch frame 30. The brace pin 82 slides through two brace pin slots 83, 84 attached to the power operable means 80. The brace pin 82 is prevented from sliding through the brace pin slots 83, 84 by a cotter pin 85 inserted into a brace pin opening 86 in the brace pin 82. The power operable means 80 has a hydraulic cylinder 90 pressured by fluid from hoses 91, 92, 93 interconnected with the hydraulic cylinder 90. The hoses 91, 92, 93 receive fluid pressure from a fluid pressure mechanism on the tractor 10 and the fluid is sent through hydraulic fittings 95 attached to the hydraulic cylinder 90 and hydraulic fittings 96 attached to the pressure relief valve 97. The pressure relief valve 97 prevents damage to the connecting pin 56 if it does not properly engage trailer tongue 120. Hydraulic cylinder pressure mechanisms of this type are well known to those skilled in the art. A powering pin 88 of the power operable means 80 is connected to the pivotal means 52 and raises or lowers within the hydraulic cylinder 90 via the hydraulic pressure from fluid in the hoses 91, 92, 93.

A tongue guide means 100 which is horizontally swingable is also attached to the hitch frame 30 between the second slotted pin guide 73 and the third slotted pin guide 75. The tongue guide means 100 has a pair of guide plates 102, 103 to guide the trailer tongue 120 for engagement with the connecting pin means 50. The guide plates 102, 103 are attached to the bottom end 33 of the hitch frame 30 by a shaft 104 welded to a back side of the guide plates 102, 103 where the guide plates 102, 103 converge close together. The shaft 104 has a spring 106 positioned surrounding the shaft 104 to allow the guide plates 102, 103 to horizontally swing with pressure contiguous to one of the plates 102 or 103 and resume a centered position when the pressure is released. The guide plates 102, 103 also have two smaller metal plates 112, 113 interfaced with the guide plates 102, 103. The two smaller plates 112, 113 do not join together, but are spaced apart around the third slotted pin guide 75. The smaller plates 112, 113 further guide the trailer tongue 120 and reduce the wear on guide plates 102, 103.

Referring now to FIGS. 3A and 3B, shown are side elevational views of the mounting of the trailer hitch 20 to the tractor 10 for engagement of the trailer tongue 120 in coupled and uncoupled positions. FIG. 3A shows the adjustability of the upper bracket means 41 of the leveling means 40. The lower position shows a side view of the upper bracket means 41 and the upper position shows a phantom view of the upper bracket means 41 in a higher position along the back side 34 of the hitch frame 30. A phantom view of the trailer tongue 120 is also shown with the connecting pin means 50 partially lowered, with the connecting pin 56 extending through the first slot pin guide 71 and the second slot pin guide 73, for engagement with the trailer tongue 120.

FIG. 3B shows a side elevational view of the trailer hitch 20 with the connecting pin 56 lowered for engagement with the trailer tongue 120. In this view, the connecting pin 56 can be seen extending through all three slotted pin guides 71, 73, 75. Also shown is a cut-away view of the tongue guide means 100 of the trailer hitch 20 attached to the bottom end 33 of the hitch frame 30. The cut-away view shows the shaft 104 welded to the guide plates 102, 103 in phantom view. Positioned surrounding the shaft 104 is the spring 106 secured by a fastening means 111.

FIG. 4 shows the trailer tongue 120 in phantom view in the engaged position. The bottom end 33 of the hitch frame 30 encloses the shaft bolt 104, the spring 106, and the fastening means 111 with four side walls. A front side wall 101 has an opening for securing the shaft 104 to the hitch frame 30. Two end side walls 107, 108 are perpendicularly connected to the front side wall 101. A back side wall 109 is perpendicularly connected to the two end side walls 107, 108 to form a rectangular enclosure 118 around the shaft 104, the spring 106, and the fastening means 111. A base plate 110 is secured to the back side wall 109 which, upon opening, allows access into the rectangular enclosure 118. This access to the rectangular enclosure 118 permits adjustment of the fastening means 111 with respect to the tongue guide means 100 and the hitch frame 30.

Referring to FIGS. 5A and 5B, shown are front views of the trailer hitch 20 in respective positions corresponding to FIGS. 3A and 3B. FIG. 5A shows the connecting pin means 50 partially lowered, with the connecting pin 56 extending through the first slotted pin guide 71 and the second slotted pin guide 73, for engagement. This view also shows the powering pin 88 of the power operable means so partially withdrawn into the hydraulic cylinder 90. FIG. 5B, in turn, shows the connecting pin means 50 lowered, with the connecting pin 56 extending through the third slotted pin guide 75, for engagement. In addition, this view shows the powering pin 88 of the power operable means 80 further extending downward from the hydraulic cylinder 90.

Figure 6:
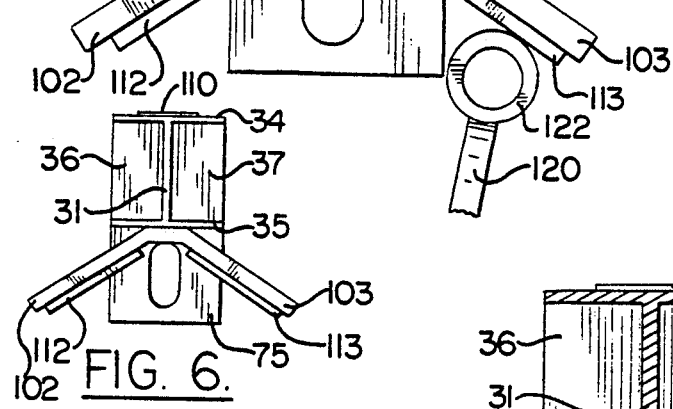
FIG. 6 is a cross-sectional view of the tongue guide taken along lines 6—6 of FIG. 5A.

FIG. 6 shows the guide plates 102, 103 interfaced with smaller plates 112, 113. Also shown is a view of the metal beam 31 with backside 34, front side 35, and channels 36, 37.

Figure 6B:
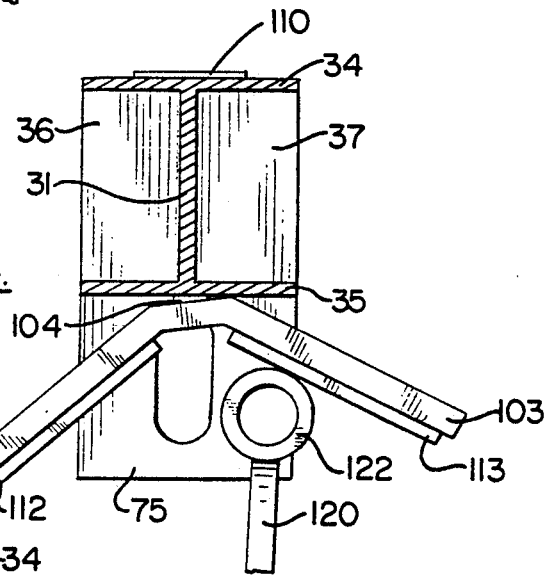
Figure 6C:
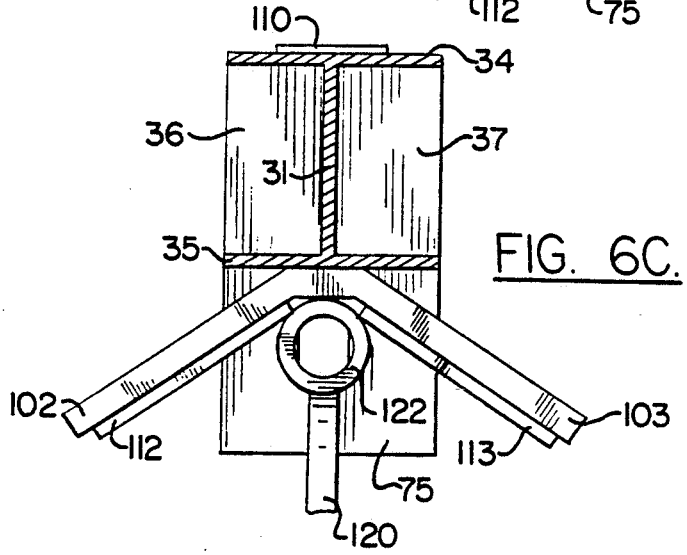

Referring now to FIGS. 6A, 6B and 6C, shown are slightly enlarged views of the tongue guide means 100 of the trailer hitch 20 illustrating the guiding of the trailer tongue 120 with aperture 122 into position for engagement with the connecting pin 56 of the connecting pin means 50. FIG. 6A shows the initial contact of the trailer tongue 120 with the tongue guide means 100 for engagement with the connecting pin 56 of the connecting pin means 50. FIG. 6B shows the horizontal swinging of the tongue guide means 100 when pressure from the trailer tongue 120 is exerted on One of the guide plates 103 and the smaller plate 113. FIG. 6C shows the restoration to a center position of the tongue guide means 100 when pressure is released from one of the guide plates 103. This view also illustrates the center position of the aperture 122 of the trailer tongue 120 for engagement with the connecting pin 56 of the connecting pin means 50.

FIGS. 7A, 7B and 7-C illustrate the lower portion of the trailer hitch 20. FIG. 7A shows the connecting pin means 50 in the fully retracted position with the connecting pin 56 extending through the first slotted pin guide 71 and the second slotted pin guide 73. The aperture 122, in phantom view, of the trailer tongue 120 is not centered underneath the connecting pin 56. FIG. 7B shows the connecting pin means 50 in a partially lowered position where the connecting pin 56 pivotally enters an upper portion of the aperture 122. FIG. 7C shows the connecting pin means 50 further lowered with the connecting pin 56 extending through the aperture 122 and through the third slotted pin guide 75. The pivotal means 52 allows the connecting pin 56 to pivotally move into the aperture 122 of the trailer tongue 120 and thereby provides play for the engagement and towing of the trailer 140.

FIG. 8 shows an oblong slot 72 of the first slotted pin guide 71. The oblong slot 72 allows the connecting pin 56 to pivotally swing through the first slotted pin guide 71, the second slotted pin guide 73, and the aperture 122 for engaging the trailer tongue 120.

Referring now to FIG. 9, there is shown an oblong slot 74 similar to the oblong slot 72 of the first slotted pin guide 71. In addition, this oblong slot 74 allows the connecting pin 56 to pivotally swing through the second slotted pin guide 73 and proceed to the aperture 122 and the third slotted pin guide 75 for engagement of the trailer tongue 120.

FIG. 10, shows the upper portion of the trailer hitch 20 illustrating the removal of a hydraulic cylinder 90 of the power operable means 80. This removal is performed by removing the cotter pin 85 from the brace pin opening 81 in the brace pin 82. After the actuator shaft 88 is unfastened from the connecting pin means 50, the power operable means 80 is slidably removed from the brace pin 82. A phantom view of the removed hydraulic cylinder 90 is also shown in FIG. 10.

FIG. 11 similarly shows the upper portion of an embodiment of the trailer hitch 20 having an electric actuator 98 as the power operable means 80. Thus, the hydraulic cylinder 90 may be replaced with the electric actuator 97 to provide power for raising, lowering, and engaging the connecting pin means 50. The electric actuator 97 may readily be connected to an electrical power supply of the tractor 10. The electrical power, is transmitted to the electric actuator 97 via an electric power circuit means 99 as shown in FIG. 11.

Referring now to FIG. 12, there is shown the lower portion of an embodiment of the trailer hitch 20 with the first slotted pin guide 71 removed by disconnecting the second bracket assembly 64. The pivotal means 52 is no longer limited from extending beyond the first slotted pin guide 71. With the first slotted pin guide 71 removed, the connecting pin 56 extends not only through the second slotted pin guide 73 through aperture 122 and the third slotted pin guide 75, but also through a second aperture 123 in the trailer tongue 120. This engagement With the second aperture 123 further secures the trailer 140 to the trailer hitch 20.

Heretofore, the invention has been discussed in reference to a tractor 10 such as is used in the agricultural industry. Hereafter, FIGS. 13-22 refer to adapting the hitch 20 used for the tractor 10 for use with any other tow vehicle which do not have lift arms 12 of some type for attaching the hitch 150 thereto.

Referring now to FIG. 13, there is shown an environmental view of a vehicle 300 with another embodiment of the trailer hitch 150 according to the present invention coupled to the tongue 310 of a luggage trailer 160. The trailer hitch 150 may also engage a tow bar or the like of a vehicle to be towed. The hitch 150 is coupled to a mounting bracket 180 on a rear end of the vehicle 300. The trailer hitch 150 is also adaptable for mounting onto a front end of a vehicle and may be used for various other trailers besides the luggage trailer 160 as shown in FIG. 13. These other trailers may include, but are not limited to, airplanes, artillery, barges, and trains. This view also shows a fluid reservoir and pump 305 connected through fluid tubes 308 to the hitch 150 to hold and transfer fluid under pressure to the hydraulic power means.

A perspective view of the trailer hitch 150 of FIG. 13 is shown in FIG. 14 including a base frame 200 slidably engaged with the hitch frame 30. To the base frame 200 is coupled a mounting bracket 220, a power liftable means 240, and a securing bracket 270 to thereby secure the power liftable means 240 to the base frame 200. To the hitch frame 30, slidably engaged with the base frame 200, is coupled the connecting pin means 50, the power operable means 80, the horizontally swingable tongue guide means 100 without the smaller plates 112, 113, all previously described herein except with the location of the bracing pin 82 connected to the hitch frame 30 slightly changed. Also, a connecting pin adjustable locating member 72 is connected to the hitch frame 30 for controlling the horizontal, but not vertical, swinging of the connecting pin 56 to thereby maintain the connecting pin 56 in a generally vertical direction for engagement with the trailer tongue 310. In addition, a scoop means 280 is adapted to be mounted vertically adjacent the horizontally swingable guide means 100 and attached to a wheeled base member 320 mounted adjacent said horizontally swingable guide means 100. The connecting pin adjustable locating member 72 and scoop means 280 are also adaptable to be mounted on the previous embodiment discussed in FIGS. 1-12.

The base frame 200 comprises a metal beam 210 similar to that of the hitch frame 30 and also having a top end 211, a bottom end 212, a back side 213, and a front side 214. The base frame 200, also like the hitch frame 30, has two channels 215, 216 extending from the top end 211 to the bottom end 212 of the metal beam 210 between the back 213 and front 214 sides.

Coupled to the base frame 200 along a channel 215 of the metal beam 210 is the power liftable means 240 which is adapted to raise and lower the trailer hitch 150 when an associated trailer 160 is attached or unattached thereto. The power liftable means 240 is coupled to the base frame 200 via the securing bracket 270 at an upper end of the channel 215. The securing bracket 270, similar to the attachment of the power operable means 80, has a brace pin 272 which slides through brace pin slots 273, 274 attached to the power liftable means 240. The brace pin 272 is prevented from sliding through the brace pin slots 273, 274 by a cotter pin 275 inserted into a brace pin opening 276. Both the power liftable means 240 and the power operable means 80 have hydraulic actuators 242, 90 which are connected to the fluid reservoir and pump 305 on the vehicle 300 by fluid tubes 308. Like the power operable means 80, the power liftable means 240 has a powering pin 248 (shown in FIG. 15A). The powering pin 248 has device 249 attached to a wheeled base member 320 which secures to the back side 34 of the hitch frame 30. When the power liftable means 240 is actuated, the powering pin 248 raises and lowers the hitch frame 30 via device 249 attached to the wheeled base member 320.

The base frame 200 also has mounting brace members 203, 204 adapted to be attached to each side 213, 214 of the metal beam 210 for mounting the base frame 200 to the vehicle 300. Coupled to the base frame 200 along a channel 216 thereof is the hitch frame 30. The back side 34 of the metal beam 31 of the hitch frame 30 engages with the channel 216 of the base frame 200 in a generally perpendicular arrangement of the metal beams 210, 31. The hitch frame 30 and the base frame 200 slidably engage in a vertical direction. Grease joints 201 (not shown in this view) keep the base frame 200 and the hitch frame 30 lubricated for the raising and the lowering thereof. Along the front side 35, of the hitch frame 30 is the connecting pin means 50, the power operable means 80, and the horizontally swingable guide means 100 previously discussed.

Figure 15A:
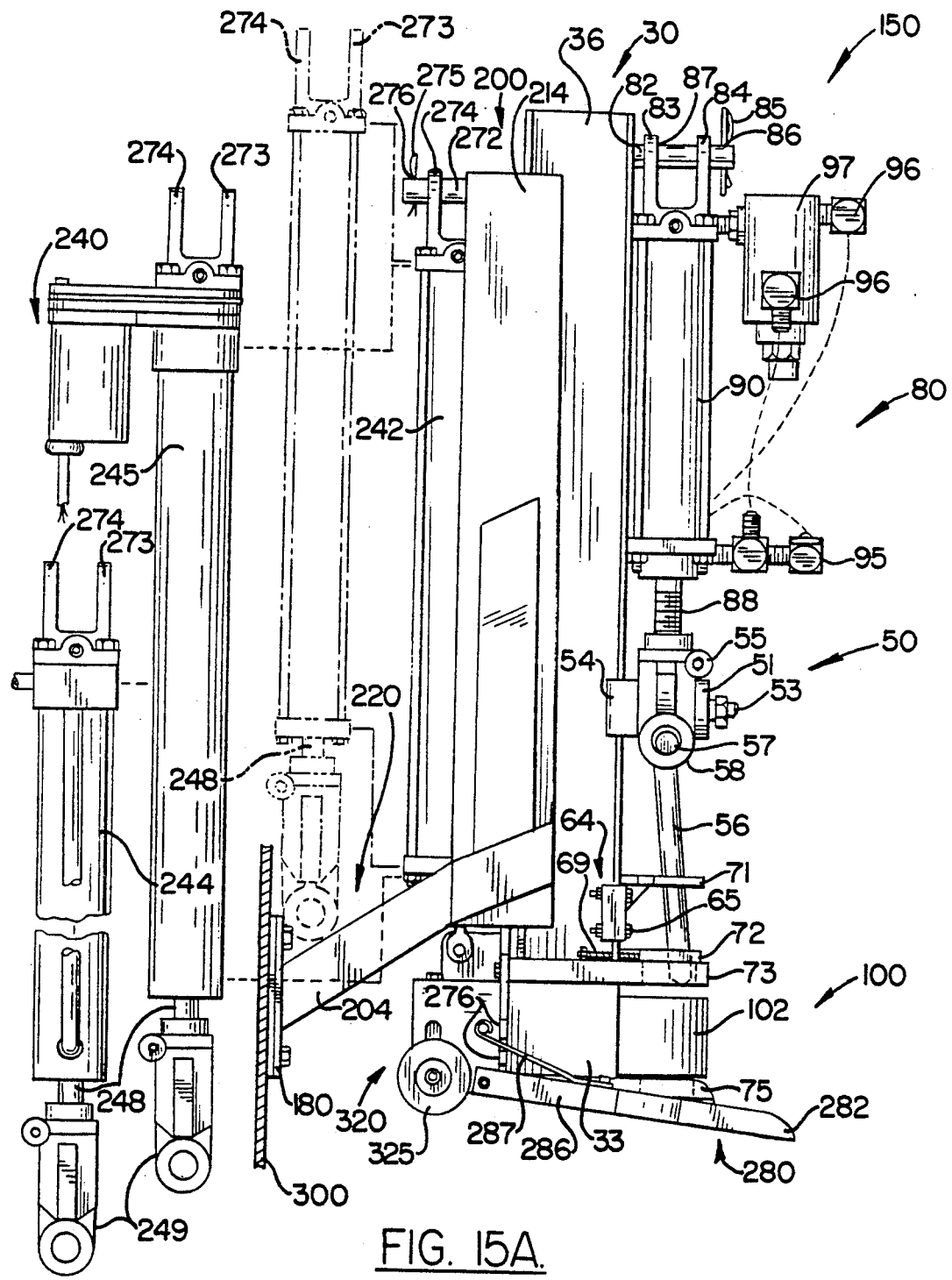
FIGS. 15A, 15B, and 15C are side elevational views of the trailer hitch of FIG. 14 in raised and lowered positions for coupling and uncoupling the trailer and illustrating the interchangeability of hydraulic and electric power liftable means.
Figure 15B:
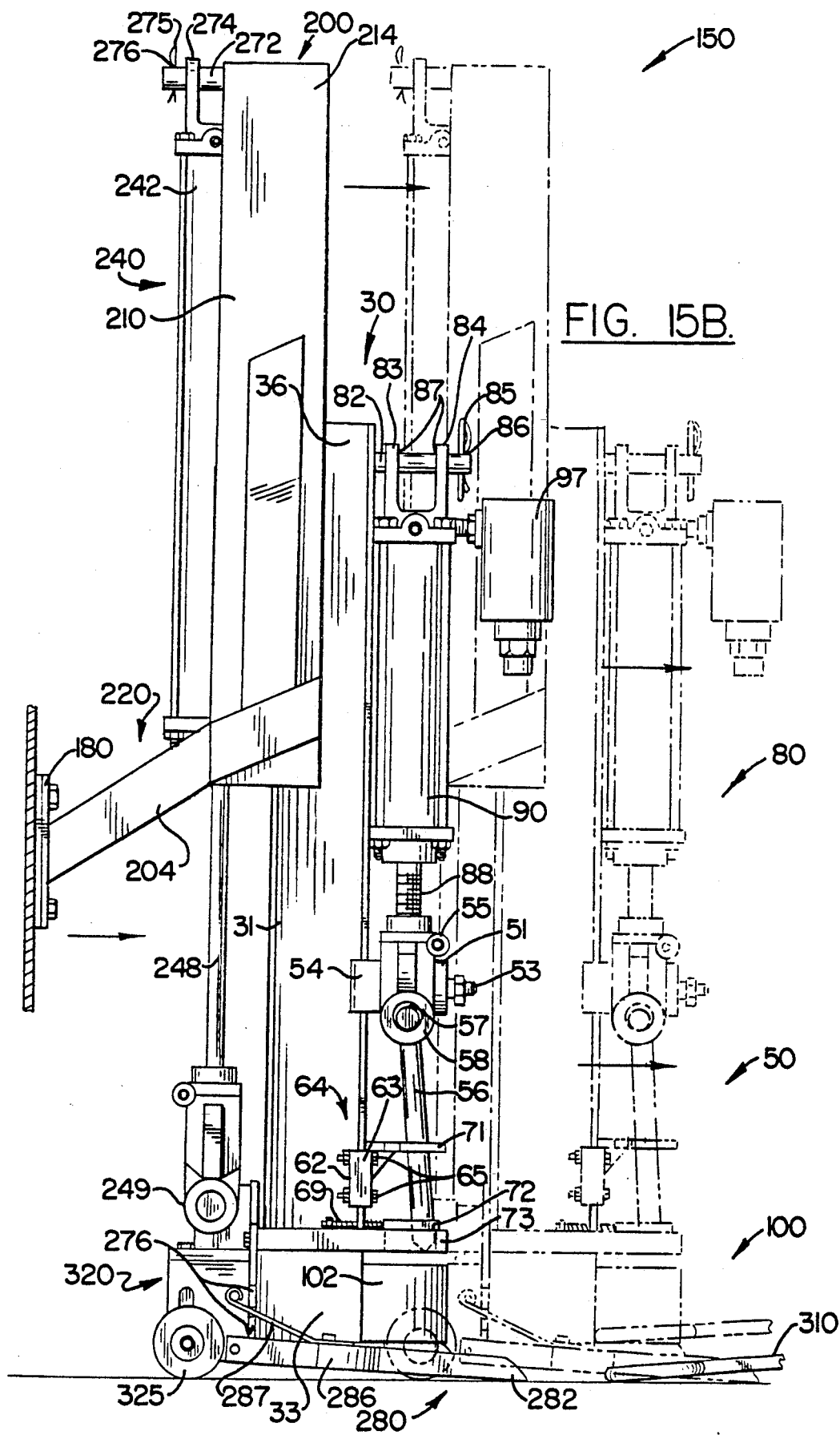
Figure 15C:
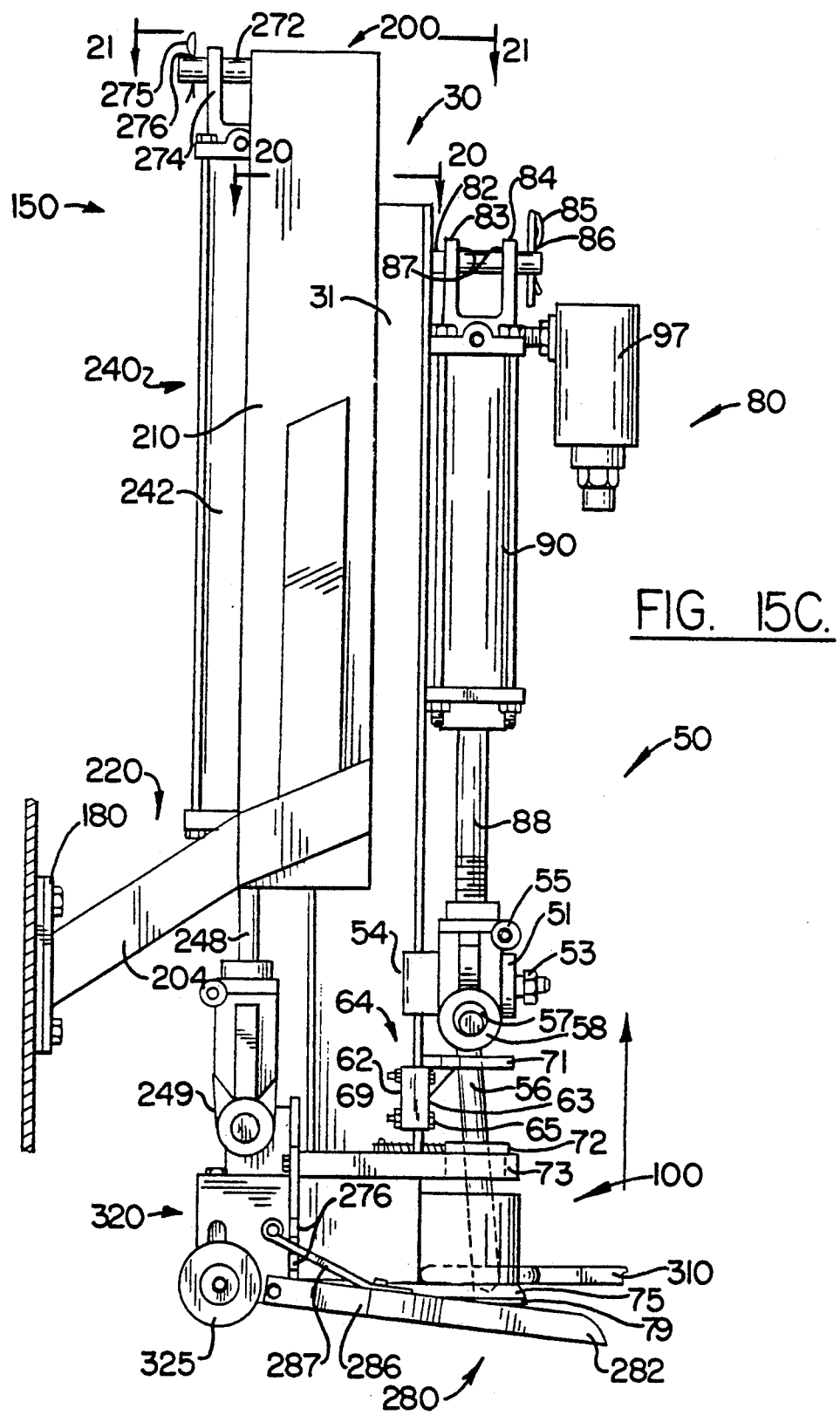

FIGS. 15A, 15B, and 15C will now be discussed to describe the raising and lowering of the base frame 200 for engaging the trailer tongue 310. FIG. 15A shows the trailer hitch 150 of FIG. 14 in a raised, uncoupled position. Notice that the scoop means 280 is slightly tilted downward so that wherein the tip 282 is below the wheels 325 of the wheeled base member 320 of the trailer hitch 150. This view also shows the interchangeability of the power liftable means 240 so as to adapt to various power actuator types. To the base frame 200 is attached a hydraulic actuator 242. This actuator 242 may be unsecured from the brace pin 272 by removing the cotter pin 275 therefrom and sliding the hydraulic actuator 242 off of the brace pin 272. Other actuators such as the electric actuator 245 or the hydraulic actuator 244 with a built-in pressure relief valve may then be substituted for the hydraulic actuator 242. Other various mechanical actuators may also be substituted for the hydraulic actuator 242. These interchangeabilities are illustrated by the phantom views in FIG. 15A. FIG. 15B shows the trailer hitch 150 lowered to contact the surface with the tip 282 of the scoop means 280 and the wheels 325 touching thereto. The pressure relief means 243 of the power liftable means 240 maintains predetermined pressure and prevents the lifting of the tow vehicle 300 and damage to the trailer hitch 150. The trailer hitch 150 then slides rearwardly for contacting and lifting up the trailer tongue 310. The trailer tongue 310 is then engaged with the connecting pin 56. A phantom view of the engaging and lifting of the trailer hitch 150 is shown for clarity purposes. In FIG. 15C is shown the engagement and lifting of the trailer tongue 310 by the trailer hitch 150 to be pulled by the vehicle 300. This view also illustrates the flexible engagement of the connecting pin 56 as previously discussed.

Figure 16:
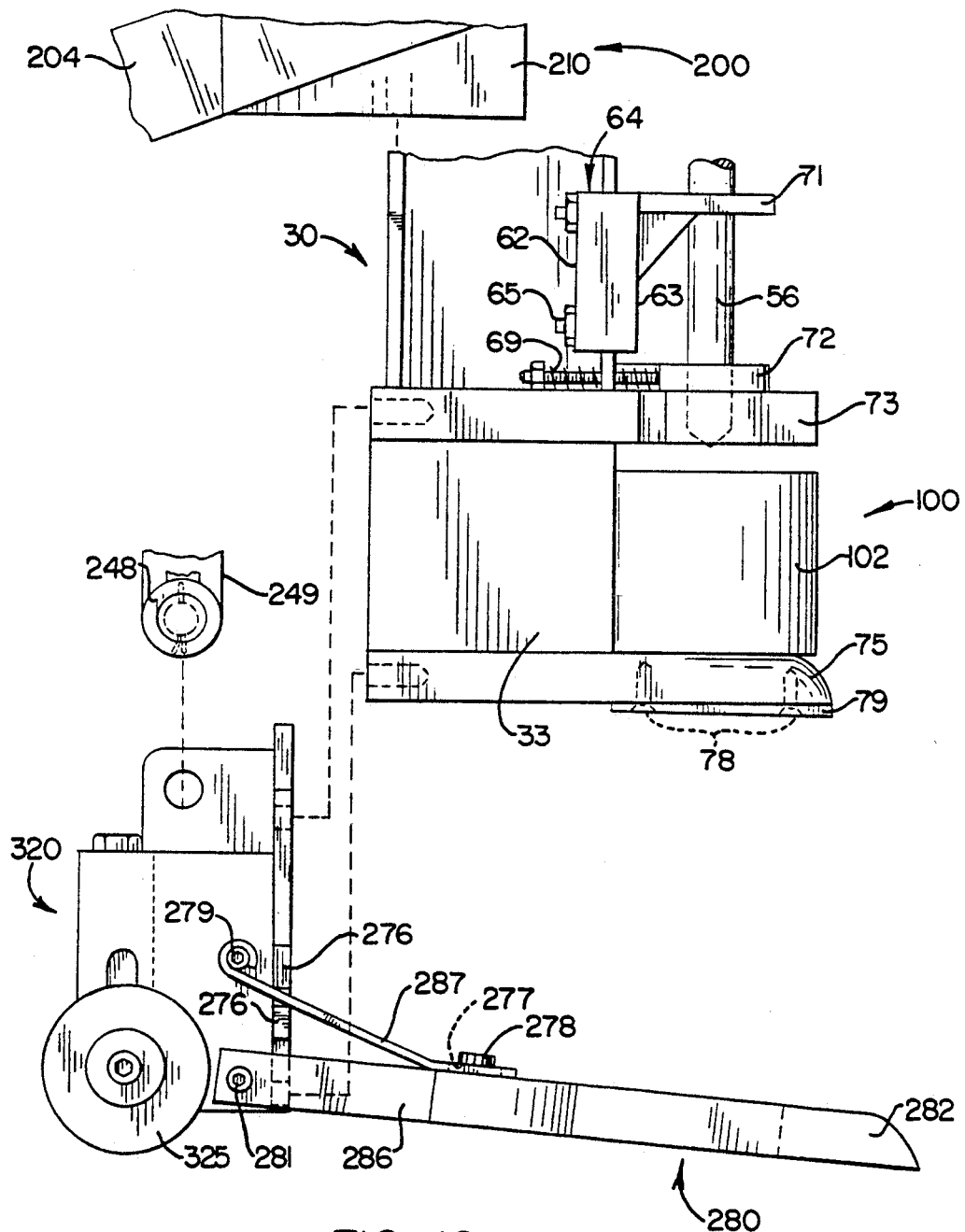
FIG. 16 is an exploded side view of the lower portion of the trailer hitch of FIG. 14 according to the present invention with parts broken away for clarity.

FIGS. 16–21 hereinafter describe how the hitch frame 30 engages the base frame 200 and secures to the wheeled base member 320 attached to the powering pin 248 and device 249 of the power liftable means 240. Shown in FIG. 16 is an exploded side view of the lower portion of the hitch 150 illustrating the attachment of the hitch frame 30 to the wheeled base member 320 and the base frame 200 via the powering pin 248 and device 249 of the power liftable means 240. This view also illustrates the mounting of the scoop means 280 to the wheeled base member 320.

The scoop means 280 is attached to the wheeled base member 320 by bolts 281 and a leaf spring 287. The leaf spring 287 is attached to the wheeled base member 320 around bolts 279 through tab members 276 and to the scoop means 320 on opposite side portions 286 thereof by bolts 278. The tab members 276 establish a fixed position for leaf spring 287 to hold it to a neutral position. The leaf spring 287 allows the scoop means to remain in a neutral position while also being pushed to a raised position by the ground or the like. The leaf spring 287 has a slot 277 that the bolt 278 inserts therethrough. The slot 277 allows the scoop means 282 to move up or down depending on the direction of pressure applied to the scoop means 282. A wear plate member 79 is attached by bolts 78 to the slot guide 75 to protect the slot guide 75. The wear plate member 79 also prevents sparks or the like from occurring in the event the slot guide 75 comes into contact with a concrete surface or the like. The wear plate member 79 may be formed of brass or other material well known to those skilled in the art to prevent the sparks and wear on the slot guide 75. This view in FIG. 16 also shows a side view of the connecting pin adjustable locating means 72 mounted through the hitch frame 30 by bolts 69 having springs therearound for adjusting and allowing movement of the locating means 72. The locating means 72 limits the horizontal swinging movement of the connecting pin 56, especially when the connecting pin 56 is in a raised position as illustrated by this view.

In FIG. 17 is shown the lower portion of the trailer hitch 150 with parts broken away for clarity. This view illustrates the spacing plates 321 in the wheeled base member 320 for adjusting the height of the wheels 325 from the ground. The spacing plates 321 may be stacked with the same size spacing plate 321 or different combinations of sizes. A frame engaging space 327 separates the wheeled base member 320 from the hitch frame 30 to thereby allow a generally even engagement between the hitch frame 30, the wheeled base member 320, and the base frame 200 when the trailer hitch 150 is in a fully raised position. This construction with the frame engaging space 327 provides mechanical interlocking between metal beam 210 and metal beam 31. While also providing load transfer when fully raised. This view also illustrates how the leaf spring 287 allows the scoop means 280 to tilt slightly below the slot guide 75 by the tip 282.

FIG. 18 is a rear view of FIG. 17 of the trailer hitch 150 taken along line 18—18 illustrating the engagement and construction of the power liftable means 240, the wheeled base member 320, and the horizontally swingable guide means 100. As can be seen from this view, the wheels 325 are held in position by bolts 326 previously discussed. The powering pin 248 via device 249 engages a top portion 328 of the wheeled base member 320 by a device pin 247 and cotton pin 246 to secure the movement of the hitch frame 30 from a raised to a lowered position and vice-versa. FIG. 19 is a top cross-sectional view of the trailer hitch 150 taken along line 19—19 of FIG. 17. FIG. 19 illustrates the engagement of the hitch frame 30 and the base frame 200. It also illustrates the engagement of the scoop means 280 with the horizontally swingable guide means 100. Beam bracing members 351 and 352 are shown in this view to further support and guide the base frame 200 with the engagement of the hitch frame 30.

FIG. 20 is a cross-sectional view taken along line 20—20 of FIG. 15C to show the hitch frame 30 and the base frame 200 having grease joints 201 to allow the hitch frame 30 and base frame 200 to slidably engage with each other in a generally vertical direction and with smooth movements therein. This view also shows the general I-beam arrangement of the base frame 200 and the hitch frame 30. FIG. 21 is a top view of the trailer hitch 150 taken along line 21—21 of FIG. 15C to thereby view its overall construction with parts numbered as previously discussed.

In FIG. 22 is shown a top plan view of the beveled scoop means 280 which will now be discussed to describe its construction thereof. The scoop means 280 has a beveled plate member 284 mounted to a frame member 286 having a three-sided rectangular shape and an open spaced portion therein. The beveled plate member 284 may be disengaged with the frame member 286 to attach other types of plate members 284 thereto. These other types of plate members 284 may include a brass plate member having ridges therein to scrape ice and snow or the like from the ground to allow the trailer hitch 150 to engage the trailer tongue 310. The bolts 289 show the location for the interchanging of the plate member 284 with the frame member 286. The three-sided rectangular shaped frame member 286 has opposite side portions, an open spaced portion, and an end portion. The open spaced portion allows the scoop means 280 to mount around and below the slot guide 75.

In the drawings and specification, there have been disclosed typical preferred embodiments of the invention, and, although specific terms are employed, their use is in a generic and descriptive sense only and not for the purposes of limitation, the scope of the invention being set forth in the following claims.

That which is claimed is:

1. A trailer hitch for connecting a tongue of a trailer to a vehicle, comprising:
   power operable means adapted to be carried by a vehicle;
   connecting pin means operably connected to said power operable means and including a vertically arranged connecting pin adapted to be moved in a vertical path of travel from an elevated uncoupled position to a lowered coupled position; and
   horizontal swingable guide means positioned alongside said connecting pin and adapted to guide the tongue of the trailer into proper position for being connected by said connecting pin, said guide means comprising a pair of guide plates convergently arranged and defining an angle therebetween with the vertex of the angle being closely adjacent the path of travel of said connecting pin and resilient means mounting said pair of guide plates at the vertex of the angle for unison horizontal swinging movement of said guide plates and for facilitating the guiding of the trailer tongue toward the vertex.

2. The trailer hitch according to claim 1, wherein said power operable means comprises hydraulic actuating means for hydraulically raising and lowering said connecting pin.

3. The trailer hitch according to claim 1, wherein said power operable means comprises electric actuating means for electrically raising and lowering said connecting pin.

4. A trailer hitch according to claim 1, wherein said connecting pin means comprises:
   pivotal means connected between said power operable means and said connecting pin for allowing said connecting pin to pivotally swing from a vertical position and adapted to provide play to thereby facilitate connecting to an aperture of the trailer tongue; and
   a pin guide having a slotted opening therein for limiting the pivotal swing of said connecting pin within a predetermined range.

5. A trailer hitch for connecting a trailer to a vehicle, comprising:
   a hitch frame adapted to be carried by the tractor;
   connecting pin means connected to said hitch frame and including a vertically arranged connecting pin adapted to be moved in a vertical path of travel from an elevated uncoupled position to a lowered coupled position;
   power operable means connected to said hitch frame and said connecting pin for moving same from an elevated uncoupled position to a lowered coupled position; and
   horizontally swingable guide means positioned alongside said connecting pin and adapted to guide the tongue of a trailer into proper position for being connected by said connecting pin, said guide means comprising a pair of guide plates convergently arranged and defining an angle therebetween with the vertex of the angle being closely adjacent the path of travel of said connecting pin and resilient means mounting said pair of guide plates at the vertex of the angle for unison horizontal swinging movement of said guide plates to thereby facilitate the guiding of a trailer tongue toward the vertex.

6. A trailer hitch according to claim 5, wherein said resilient means comprises a spring operably connected between said guide plates and said hitch frame to permit unison horizontal swinging movement of said guide plates.

7. The trailer hitch according to claim 5, wherein said resilient means comprises:
   a shaft coupled to said pair of guide plates and extending through an opening in said hitch frame;
   a spring surrounding said shaft; and
   fastening means coupled to an end of said shaft opposite said guide plates for retaining said spring on said shaft in a compressed condition.

8. A trailer hitch according to claim 5, wherein said hitch frame further comprises leveling means coupled to said hitch frame and adapted to be coupled to the vehicle for vertically orienting said trailer hitch.

9. A trailer hitch according to claim 8, wherein said leveling means comprises:
   upper bracket means slidably coupled to said hitch frame and adapted for adjustably selecting a coupling location of said hitch frame to an upper lift arm of the vehicle; and
   lower bracket means coupled to said hitch frame and adapted for engaging a lower lift arm of the vehicle.

10. A connecting pin means according to claim 5, wherein said connecting pin means comprises:
    pivotal means connected to said connecting pin for allowing same to pivotally swing from a vertical position and adapted to provide play to thereby facilitate connecting to an aperture of the trailer tongue; and a pin guide having a slotted opening therein for limiting the pivotal swing of said connecting pin within a predetermined range.

11. A trailer hitch according to claim 5, wherein said power operable means comprises hydraulic actuating means for hydraulically raising and lowering said connecting pin.

12. A trailer hitch according to claim 5, wherein said power operable means comprises electric actuating means for electrically raising and lowering said connecting pin.

13. A trailer hitch for connecting a tongue of a trailer to a vehicle, comprising:
a hitch frame;
power operable means adapted to be carried by said hitch frame;
tongue guide means for guiding a tongue of a trailer to engage the trailer hitch; and
connecting pin means operably connected to said power operable means and including a pivotally secured connecting pin adapted to be moved from an elevated uncoupled position to a lowered coupled position, said connecting pin means further including a pin guide mounted to said hitch frame and being positioned transverse to said connecting pin and vertically spaced from said tongue guide means for coupling the tongue of the trailer, said pin guide having a slotted opening therein for receiving therein said connecting pin so as to limit the pivotal swing of the same within a predetermined range.

14. A trailer hitch according to claim 13, wherein said pin guide is located at such a position in relation to the connecting pin means so as to limit the depth of the vertical stroke of the connecting pin.

15. A trailer hitch according to claim 13, wherein said power operable means comprises hydraulic actuating means for hydraulically raising and lowering said connecting pin.

16. A trailer hitch according to claim 13, wherein said power operable means comprises electric actuating means for electrically raising and lowering said connecting pin.

17. A trailer hitch for connecting a tongue of a trailer to a vehicle, comprising:
power liftable means adapted to be carried by the vehicle for raising and lowering the trailer hitch;
power operable means adapted to engage said power liftable means;
connecting pin means operably connected to said power operable means and including a vertically arranged connecting pin adapted to be moved in a vertical path of travel from an elevated uncoupled position to a lowered coupled position; and
horizontally swingable guide means positioned alongside said connecting pin and adapted to guide the tongue of the trailer into proper position for being connected by said connecting pin, said guide means comprising a pair of guide plates convergently arranged and defined at an angle therebetween with the vertex of the angle being closely adjacent the path of travel of said connecting pin and resilient means mounting said pair of guide plates at the vertex of the angle for unison horizontal swinging movement of said guide plates and for facilitating the guiding of the trailer tongue toward the vertex.

18. A trailer hitch according to claim 17, further comprising scoop means adapted to be mounted vertically adjacent said horizontally swingable guide means for contacting the ground and thereby scooping the trailer tongue off the ground for guiding into engagement with the connecting pin.

19. A trailer hitch according to claim 18, further comprising a wheeled base member mounted adjacent said horizontally swingable guide means and having said scoop means attached thereto.

20. A trailer hitch according to claim 17, wherein said trailer hitch further comprises connecting pin locating means for controlling horizontal movement of said connecting pin.

21. A trailer hitch according to claim 17, wherein said power liftable means comprises hydraulic actuating means for hydraulically raising and lowering the trailer hitch.

22. A trailer hitch according to claim 17, wherein said power operable means comprises hydraulic actuating means for hydraulically raising and lowering said connecting pin.

23. A trailer hitch according to claim 17, wherein said power liftable means comprises electric actuator means for electrically raising and lowering the trailer hitch.

24. A trailer hitch according to claim 17, wherein said power operable means comprises electric actuating means for electrically raising and lowering said connecting pin.

25. A trailer hitch according to claim 17, wherein said connecting pin means further comprises:
pivotal means connected between said power operable means and said connecting pin for allowing said connecting pin to pivotally swing from a vertical position and adapted to provide play to thereby facilitate connecting to an aperture of the trailer tongue; and
a pin guide having a slotted opening therein for limiting the pivotal swing of said connecting pin within a predetermined range.

26. A trailer hitch for connecting a trailer to a vehicle, comprising:
a base frame adapted to be carried by the vehicle;
a hitch frame adapted to engage said base frame;
power liftable means connected to said base frame for raising and lowering said hitch frame;
connecting pin means operably connected to said hitch frame and including a vertically arranged connecting pin adapted to be moved in a vertical path of travel from an elevated uncoupled position to a lowered coupled position;
power operable means connected to said hitch frame and said connecting pin for moving the same from an elevated uncouple position to a lowered coupled position; and
horizontally swingable guide means positioned alongside said connecting pin and adapted to guide the tongue of the trailer into proper position for being connected by said connecting pin, said guide means comprising a pair of guide plates convergently arranged and defined at an angle therebetween with the vertex of the angle being closely adjacent the path of travel of said connecting pin and resilient means mounting said pair of guide plates at the vertex of the angle for unison horizontal swinging movement of said guide plates to thereby facilitate the guiding of the trailer tongue toward such vertex.

27. A trailer hitch according to claim 26, further comprising scoop means vertically adjacent said horizontally swingable guide means for contacting the ground and thereby scooping the tongue of the trailer off the ground for engagement with said connecting pin.

28. A trailer hitch according to claim 26, wherein said resilient means of said horizontally swingable guide means comprises a spring operably connected between said guide plates and said hitch frame to permit horizontal swinging movement of said guide plates.

29. A trailer hitch according to claim 26 wherein said resilient means comprises:
    a shaft coupled to said pair of guide plates and extended through an opening in said hitch frame;
    a spring surrounding said shaft; and
    fastening means coupled to an end of said shaft opposite said guide plates for retaining said spring on said shaft in a compressed condition.

30. A trailer hitch according to claim 27, wherein said hitch frame further comprises a wheeled base member mounted adjacent said horizontally swingable guide means and having said scoop means attached thereto.

31. A trailer hitch according to claim 26, wherein said base frame further comprises mounting bracket means coupled to said base frame and adapted to be coupled to a vehicle for securing said trailer hitch thereby.

32. A trailer hitch according to claim 26, wherein said connecting pin means further comprises:
    pivotal means connected to said connecting pin for allowing same to pivotally swing from a vertical position and adapted to provide play to thereby facilitate connecting to an aperture of the trailer tongue; and
    a pin guide having a slotted opening therein for limiting the pivotal swing of said connecting pin within a predetermined range.

33. A trailer hitch according to claim 26, wherein said power liftable means comprises hydraulic actuating means for hydraulically raising and lowering said hitch frame.

34. A trailer hitch according to claim 26, wherein said power liftable means comprises electric actuating means for electrically raising and lowering said hitch frame.

35. A trailer hitch according to claim 27, wherein said scoop means comprises a beveled plate member for scooping the ground and thereby lifting the trailer tongue.

36. A trailer hitch according to claim 35, wherein said beveled plate member is composed of brass.

37. A trailer hitch according to claim 26, wherein said trailer hitch further comprises connecting pin locating means for controlling horizontal movement of said connecting pin.

* * * * *